United States Patent [19]
Shimamoto et al.

[11] Patent Number: 5,261,052
[45] Date of Patent: Nov. 9, 1993

[54] DESIGNATED MAIL DELIVERY SYSTEM

[75] Inventors: Yukio Shimamoto, Yokohama; Yukio Nakata, Kawasaki, both of Japan

[73] Assignee: Hitachi, Ltd., Tokyo, Japan

[21] Appl. No.: 497,983

[22] Filed: Mar. 22, 1990

[30] Foreign Application Priority Data

Mar. 27, 1989 [JP] Japan .................. 1-071710

[51] Int. Cl.⁵ ............................................. G06F 13/00
[52] U.S. Cl. .................................................... 395/200
[58] Field of Search ................ 395/200, 325, 800; 364/DIG. 1, DIG. 2

[56] References Cited

U.S. PATENT DOCUMENTS

| | | | |
|---|---|---|---|
| 4,918,722 | 4/1990 | Duehren et al. | 379/100 |
| 5,057,935 | 10/1991 | Williams | 358/402 |
| 5,109,519 | 4/1992 | Zimmet et al. | 395/800 |

FOREIGN PATENT DOCUMENTS 61-120543 6/1986 Japan .

*Primary Examiner*—Robert L. Richardson
*Attorney, Agent, or Firm*—Antonelli, Terry, Stout & Kraus

[57] ABSTRACT

A data transfer system for transferring data among plural terminals which are connected through a transmission line. Each terminal capable of performing distributed processing and includes an unit for delivering on the line a first signal having an identification information of a user who utilizes the terminal and an identification information of the terminal and a unit for delivering on the line a second signal having an identification information of a destination user to which data is to be transferred as an identification information of the terminal which is a delivery source of the data. At least one of the terminals includes a memory for receiving the first signal on the line and for storing the identification information of the user and the identification information of the terminal of the first signal in a manner that history of the received identification information of the terminal is stored for each of the identifications of the users, and an unit for receiving the second signal on the line, for searching said memory on the basis of the identification information of the destination user of the second signal to read out a newest one of the stored identification information of the terminal associated with the received identification information of the user of the second signal and for delivering on the line a third signal having the read identification information and the identification information of the second signal.

25 Claims, 17 Drawing Sheets

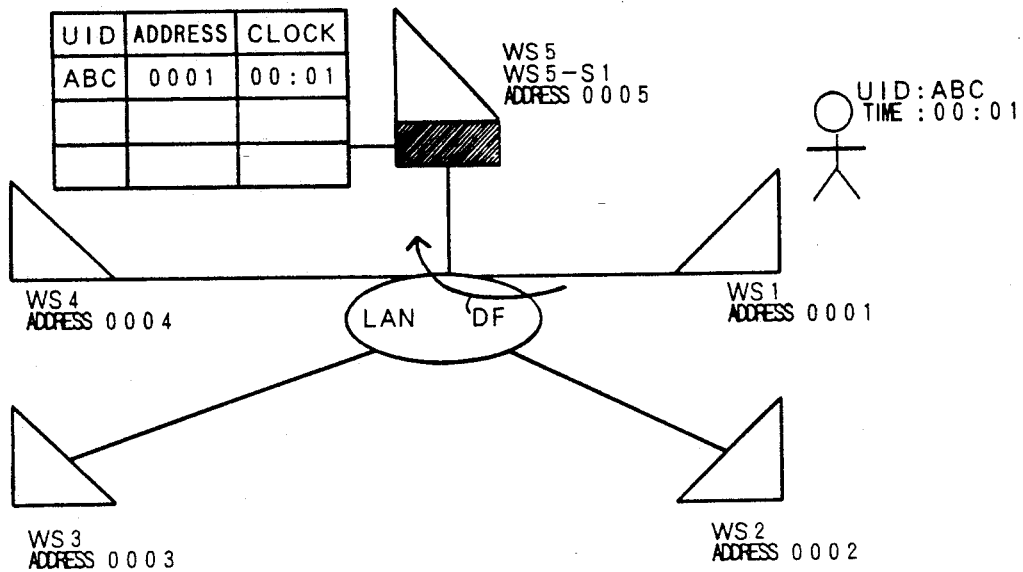

FIG. 4
| UID | ADDRESS | | TIME |
|---|---|---|---|
| | PHYSICAL ADDRESS | LOGICAL ADDRESS | |
| ABC | 0 0 0 1 | 0 0 0 1 | 0 0 : 0 1 |
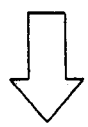
| UID | ADDRESS | | TIME |
|---|---|---|---|
| | PHYSICAL ADDRESS | LOGICAL ADDRESS | |
| ABC | 0 0 0 2 | 0 0 0 1 | 0 0 : 1 1 |
FIG. 5
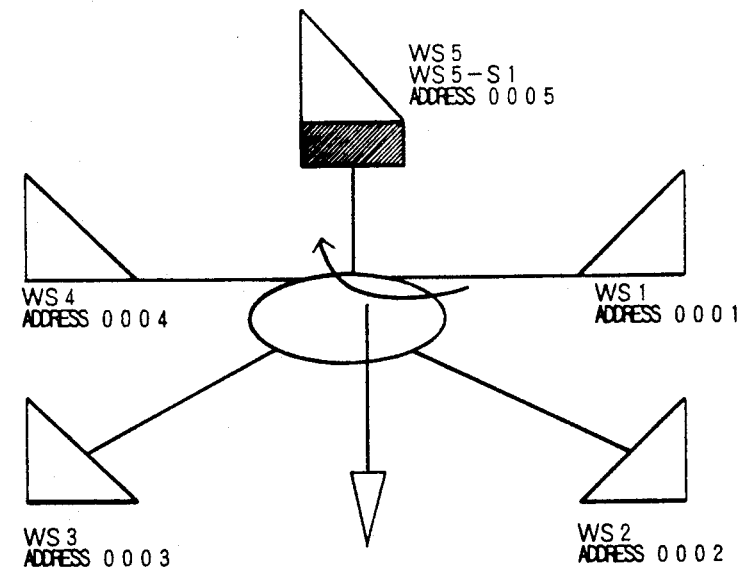
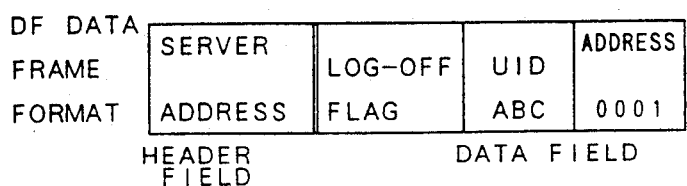
| DF DATA FRAME FORMAT | SERVER ADDRESS | LOG-OFF FLAG | UID ABC | ADDRESS 0001 |
|---|---|---|---|---|
| | HEADER FIELD | | DATA FIELD | |

FIG. 6

| UID | ADDRESS | | TIME |
| --- | --- | --- | --- |
| | PHYSICAL ADDRESS | LOGICAL ADDRESS | |
| ABC | 0 0 0 1 | 0 0 0 0 | — |
| | 0 0 0 2 | 0 0 0 1 | 0 0 : 0 1 |
| BCD | 0 0 0 3 | 0 0 0 1 | 0 0 : 0 8 |

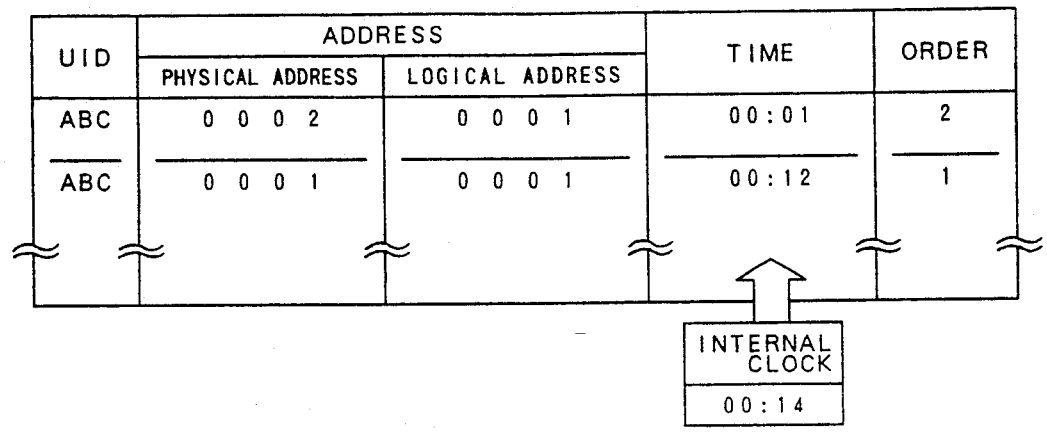

DESIGNATED MAIL DELIVERY SYSTEM

BACKGROUND OF THE INVENTION

The present invention relates to a data mail system of a computer network of the distributed processing type, and more particularly to an electronic mail system in a LAN (local area network) having at least one name server.

In a prior art system such as one disclosed in JP-A-61-120543, attention is paid only to address management and a method of transferring modified information of an address, and only a device address is used to determine a delivery address. Thus, if a user changes a log-in location, there is no function to trace a person who is the true deliveree when the mail is to be delivered. Further, in the prior art system, only one server which provides a forwarding service is provided in the LAN, and a system in which a plurality of servers are provided in one LAN and user information is distributedly managed by the servers has not been addressed.

In the above prior art system, when the mail is transferred in the LAN, no consideration is said to a tracing function of the user to whom the mail is to be transferred thus mail is sent to the physical address of the transferee without knowing the presence or absence of the person who is a true transferee. When the user moves or the user keys in at one workstation while he/she logs in at a plurality of workstations, there is no function to forward the mail to the location at which the user is keying in.

SUMMARY OF THE INVENTION

It is an object of the present invention to provide a data transfer system such as a mail delivery system in which a server traces an address of a user who keyed in at any location in a network. The user logs in at any location in the network using a user identification number (ID) so that a mail sender can send a mail to the owner of an user (ID) user by merely designating the user ID without knowing the location at which the owner of the user ID who is the transferee of the mail is located.

In order to achieve the above object, a database which has user ID's (UID's) as user names, physical addresses of hardware which the user use, logical addresses of programs to which the users access and flags indicating that the users are keying in or information on key-in times or key-in sequences is provided on a server in the LAN.

The UID is registered in the server when the user logs on at a station in the LAN, and it is erased when the user logs off and does not log on again in a predetermined period of time. An address of the log-on location is set in an address area corresponding to the UID, and the address on that table is updated each time the user logs on at a different location. When the user keys in including the log-on key-in, the operation time is recorded in the server. When the user logs on at a plurality of workstations or from a plurality of programs, a trace indicating key-in times or key-in sequence is recorded. When a mail delivery request is sent to the server from a user of one workstation, the server sends information corresponding to the destination UID to the requester, determines a destination address at which the user is most probably present by a key entry monitoring function of the server and a user location determination function of the workstation, and sets that address to the mail.

When the user logs on at the station, the UID of the log-on user is sent to the server, and the server searches the database in the server. If the corresponding UID is not found, address data which indicates the UID, the log-on location and the program is recorded in the database. If the corresponding UID is found, address data which indicates the log-on location and the program is recorded in the database. When the user logs off, the address of the log-off location is erased. If no address corresponding to the UID remains, the UID is also erased unless the user logs on again in a predetermined period. When the user keys in, the key-in location, the address of the program and the operation time are reported to the server. When a mail delivery request is issued to the server, the server searches the UID's of the log-on users, and if the corresponding one is found, it sends the address and time having the latest key-in time to the requester. The workstation that requested the mail delivery determines whether the user is present at that address or not based on the time sent from the server, and if the workstation determines that the user is present, it sets that address to the mail and transfers the mail to the addressee.

In accordance with the present invention, the mail may be sent by merely designating the user ID without paying attention to the address of the destination user who logs in at one station. Accordingly, even if the user moves, the communication may be made to the location at which the destination user will surely be present. The communication may be made by using only one command and designating the user ID without using complex commands and without knowing the location at which the destination user is present. Accordingly, a burden of the communicating user is reduced. Further, the server manages the location at which the user is present and monitors the log-in status or operation status of the user. Thus, the direct communication between user can be attained even in an environment of a distributed network which has no host computer. Accordingly, an efficiency of business which requires a communication function without routing a common communication box is improved. In the mail transfer, main text of the mail may be stored in a communication box of a sender or a receiver so that the server function is distributed in the LAN. Thus, the user information may also be distributedly managed and a system having a large capacity common memory is not necessary.

BRIEF DESCRIPTION OF THE DRAWINGS

FIG. 1A shows one embodiment of a designated mail delivery system of the present invention;

FIG. 1B shows an example of a data frame format;

FIG. 2 shows a table of a database having a UID, an address and a log-on time newly registered;

FIG. 3 shows a table of the database having an address and a log-on time additionally recorded;

FIG. 4 shows a change of the tables before overwriting and after overwriting;

FIG. 5 shows a manner in which a log-off data frame is sent to a server;

FIG. 6 shows a manner in which an address is erased from the table;

FIG. 14 shows a determination table and an internal clock in a workstation;

FIGS. 15A-15G show elements of the data frame; and

DESCRIPTION OF THE PREFERRED EMBODIMENTS

Figure 7:
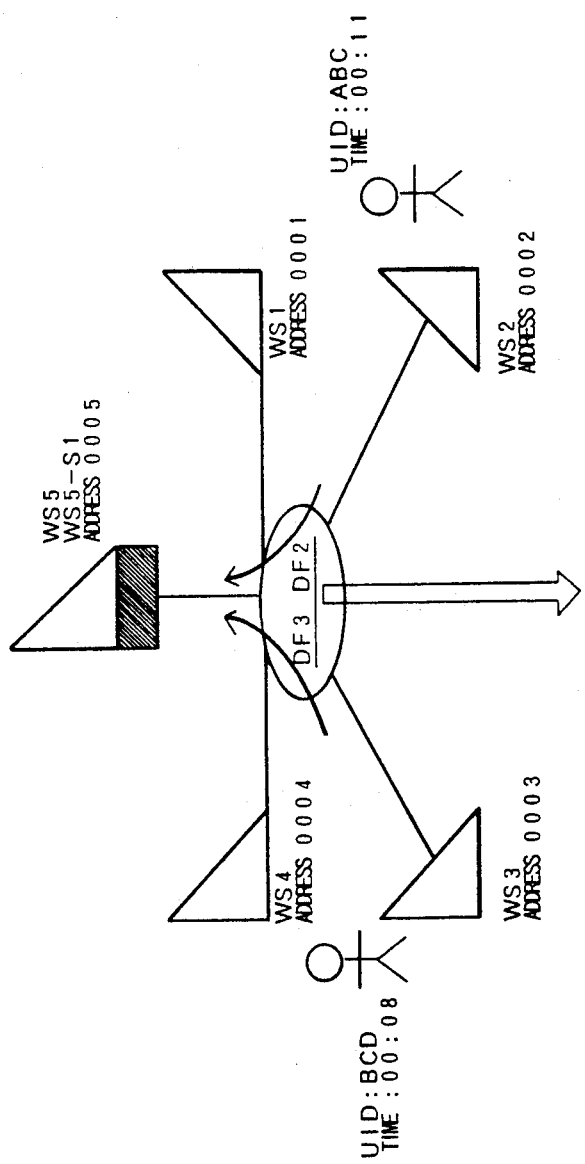
FIG. 7 shows a manner in which a data frame is sent to the server.

The preferred embodiments of the present invention are now explained with reference to the accompanying drawings. FIG. 1A shows a configuration of a data mail system of a computer network of a distributed processing type, e.g. a LAN, used in the embodiment.

WS1-WS5 denote workstations which are interconnected by a LAN. A hatched area shows a server function unit (WS5-S1).

LOG-ON AND LOG-OFF OPERATIONS

Referring to FIGS. 1A to 6, the log-on and log-off operations of the present invention are explained.

When a user logs on at a workstation, e.g. WS1, WS1 adds to a log-on flag (see FIG. 15A) the UID, an address of the log-on location (i.e. an address of the log-on workstation), an address of program (logical address) which is operated at the log-on workstation and the log-on time, and sends it as a data frame (DF) shown in FIG. 1B to the server WS5-S1. Hereafter, an address representing the position of a workstation will be referred as a physical address. When WS5-S1 receives the log-on flag, it searches a database of its own to determine whether the user has already logged on at another workstation. If no previous registration is found, the UID is newly registered, and the log-on physical address, the program logical address (hereinafter those two addresses are collectively referred to as an address) and the log-on time are recorded.

FIG. 2 shows a table of the database having the UID, address and log-on time newly registered. If the user has already logged on at another workstation and the UID has been registered, the address which indicates the new log-on location and the log-on time are additionally recorded for that UID. FIG. 3 shows a table of the database having the address and the log-on time additionally recorded. In this manner, one user is permitted to log on at a plurality of workstations or programs and the presence of plural addresses to one UID is permitted.

Alternatively, in the address registration function, the address may be updated by overwriting for the UID. FIG. 4 shows a change of tables before over-writing and after overwriting. An advantage of this method is a small memory area of the table. Another advantage of this method is that search items are less and search time is shorter because the UID's and the addresses have one-to-one correspondence.

FIG. 5 shows a manner in which the log-off data frame is sent to the server when the user logs off. It is assumed that the users have logged on WS1, WS2 and WS3 and the users at WS1 and WS2 are the same person having the same UID. It is further assumed that the user who logged on at the two locations now logs off WS1. Thus, the UID and the address are added to the log-off flog as shown in FIG. 5 and it is sent to the server. When the server receives the log-off flag, it searches for the corresponding UID. If the corresponding address is found, that address is erased.

FIG. 6 shows a manner in which the address is erased from the table when WS1 is logged off. When all addresses having one UID are erased by the log-off, the UID may be erased unless the user logs on a gain in a predetermined period of time. In this manner, the mail delivery service for the mail delivery request to the user who is not logging on and who is no longer present in the LAN is suppressed.

USER KEY ENTRY OPERATION

FIG. 7 shows a manner in which data frames DF2 and DF3 having UID's, addresses and key entry times as key entry information at WS2 and WS3 respectively, are sent to the server when the user keys in. The key entry time in the operation time record area corresponding to the UID and the address of the table in the server is updated by the data frame.

Alternatively, when the user keys in, the address and the time may be overwritten on the server to update the information. In this case, a function to newly register the UID when the UID no longer exists because the user has logged off at another workstation is required. Alternatively, the number of times of log-off may be managed for each user so that the UID is not erased unless the log-off is made by that number of times.

KEY ENTRY MANAGEMENT TABLE OF DESTINATION USER

Figure 8:
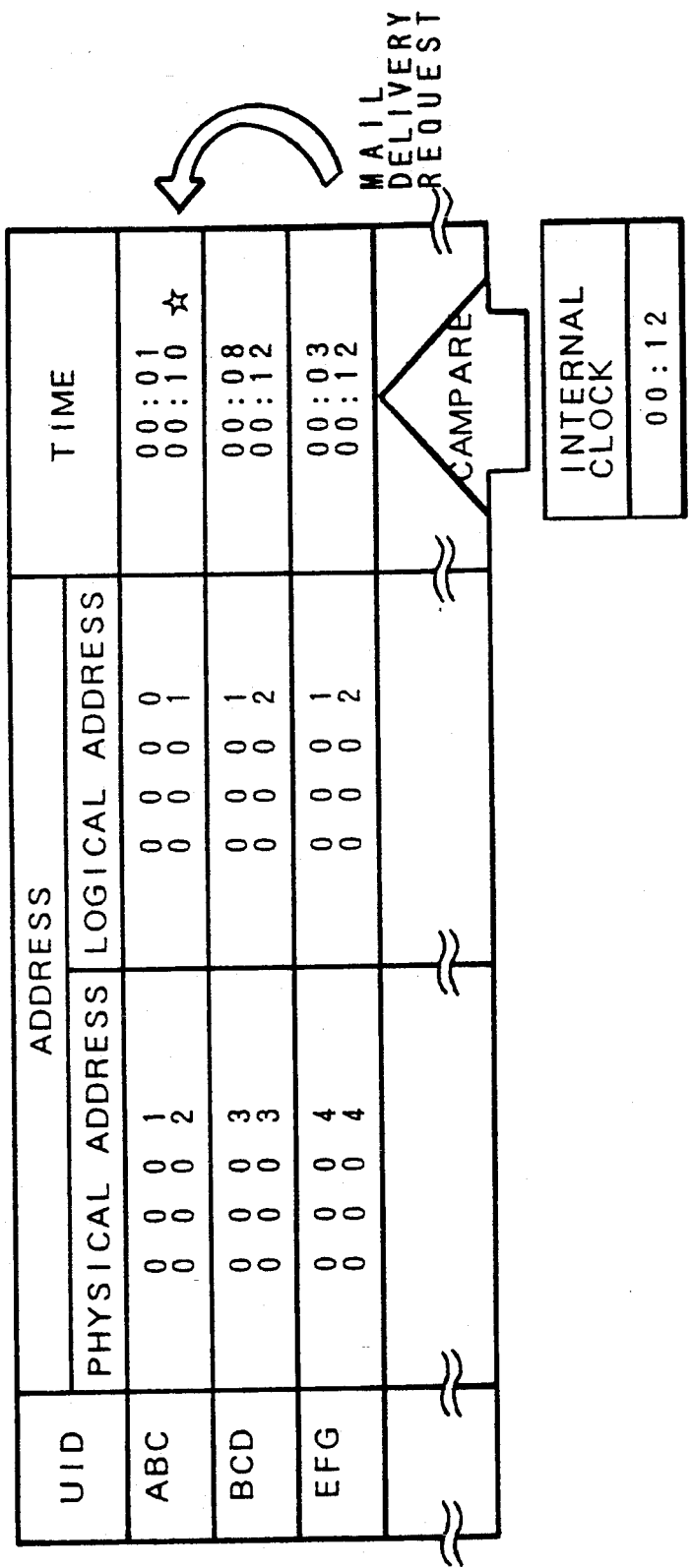
FIG. 8 shows a management table of a key entry status of the user in the server.

FIG. 8 shows a management table for key entry status of the user in the server. An arrow indicates that a mail delivery request has been issued from a person having BCD as the UID to a person having ABC as the UID. When the server receives an address query frame from BCD, the server compares the key entry times (00:01, 00:11) corresponding to ABC (physical addresses 0001, 0002, logical addresses 0001, 0001) with the clock (00:12) in the server to find the address (physical address 0002) which indicates the latest time (00:11) and determines that it is the location at which ABC is currently keying in. Thus, the server records the UID (ABC), the address (physical address 0002, logical address 0001) and the key entry time (00:11) in the data frame and sends it to the queryer (BCD). The querying workstation WS3 compares the time of the clock in the workstation with the time recorded in the data frame sent from the server, and if it is within an allowable time which the user presets, it sets the address sent from the server to the mail and sends out the mail. Alternatively, where a plurality of servers are defined in one LAN and the mail destination user logs on at a plurality of workstations and the UID's at those log-on workstations are made by the user to different servers, the data frames having the addresses corresponding to the user and the time recorded therein are sent from a plurality of servers to the querying workstation. In this case, the querying workstation compares the time with the time of the internal clock and selects the data frame having the latest key entry time.

OPERATION WHEN LAN IS GROUPED INTO TWO

Figure 9:
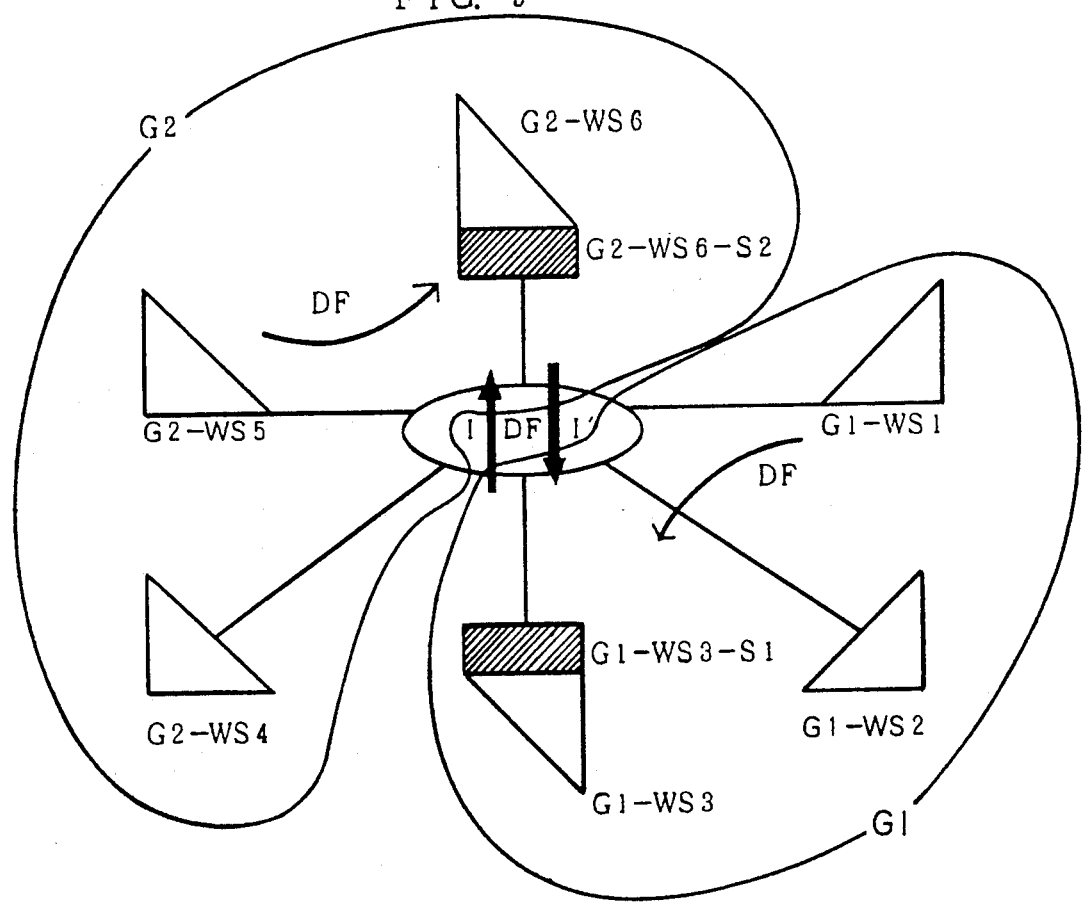
FIG. 9 shows another embodiment of the LAN configuration of the present invention.

FIG. 9 shows a modification of the LAN in which two serves are defined in one LAN and workstations are grouped for each server. When the workstations are grouped, a group address is set and it is added at the times of log-on, log-off, key entry and address query. The server is started by that address. The data frame at the times of log-on, log-off, key entry and address query is sent from the workstation in the group to the server that manages the group. In the address query, if the server is queried about the UID which is not in the database of its own, it uses the address of other server which has previously been defined in the server to search the information of the data bases across the servers.

OPERATION WHEN A PLURALITY OF SERVERS ARE PROVIDED IN THE LAN

Figure 10:
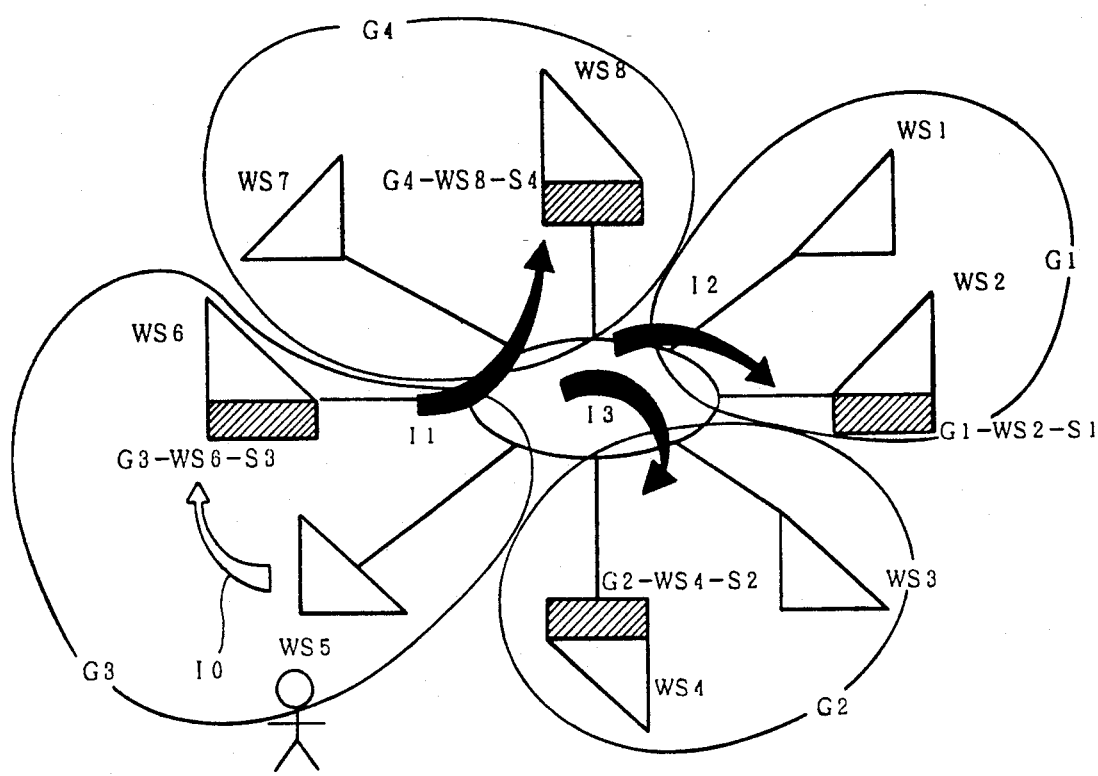
FIG. 10 shows a manner in which a destination address is searched.

FIG. 10 shows a manner in which a destination address is searched (T1, T2, T3) by a multicasting function when a plurality of servers (GWS-S1 to GWS-S4) are provided in one LAN and the workstations (WS1 to WS8) are grouped for each server. When the user logs on or keys in, the user UID, the address and the operation time are registered in the server of the group. If a user of WS5 queries about the mail delivery request to a user in other group, to the server of its own group, the server G3-WS6-S3 uses the multicasting function to send the search frame to all other servers. When other servers receive the search frame, key immediately start the search based on the UID. Now, the server G3-WS6-S3 may send the search frame to all other workstations (WS1-5, WS7-8) by using a broadcasting function. If the corresponding UID is not found, the server neglects it. If the corresponding UID is found, the server sends the data frame including the corresponding UID (ABC), the address (0001, 0003) and the operation time to the workstation WS5 which has issued the mail delivery request.

Figure 11:
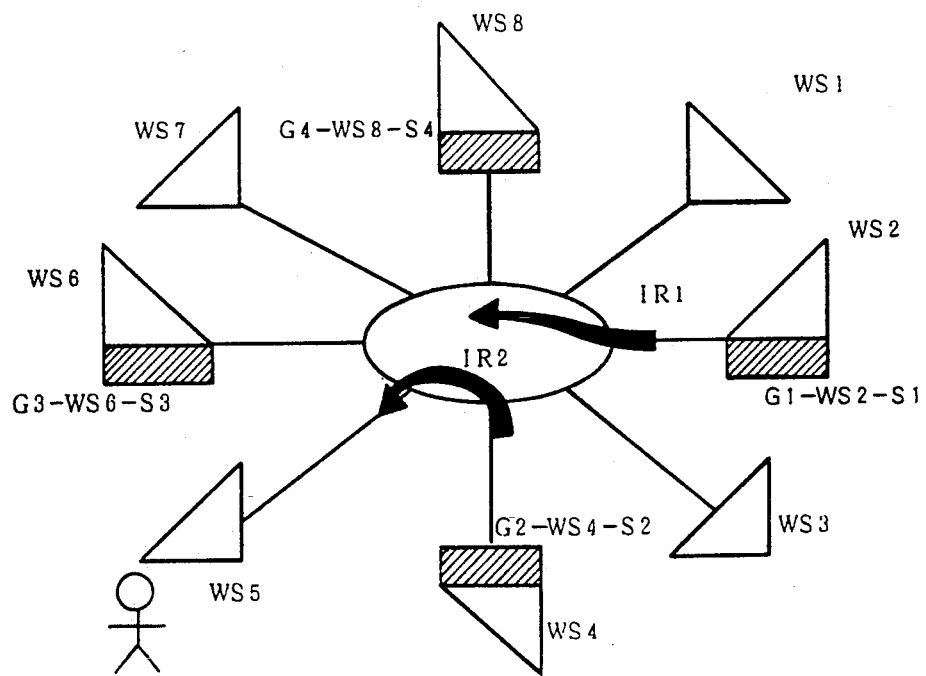
FIG. 11 shows a manner in which the data frame is sent back.

FIG. 11 shows a manner in which the server that has the corresponding UID sends back the data frame including the designation address and the operation time to the mail delivery requester. When the mail delivery requesting workstation receives the data frames from a plurality of servers, it compares the time of the clock of its own with the time recorded in the data frame and selects the latest one. If it is within the allowable time, it sends the mail to that address.

OPERATION WHEN ALL WORKSTATIONS IN THE LAN HAVE SERVER FUNCTIONS

Figure 12:
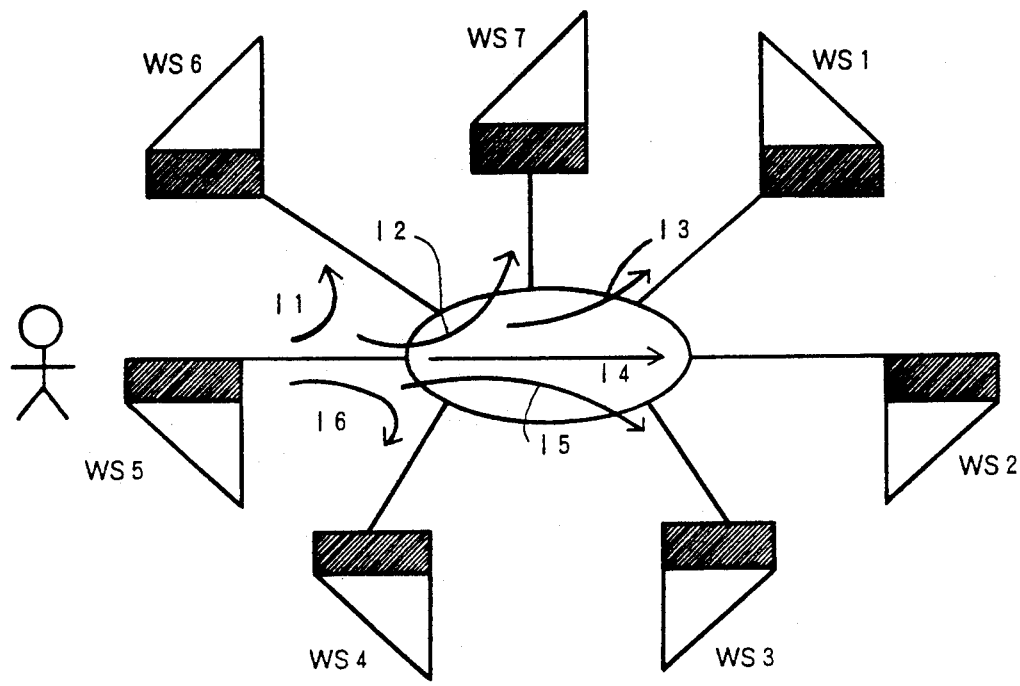
FIG. 12 shows a manner in which a destination UID is searched.

FIG. 12 shows a manner in which the destination UID is searched when all workstations (WS1-WS7) have the server functions. In this case, since the UID is registered only in the server in the workstation, there is no need for grouping the workstations. Further, the data frame at the times of log-on, log-off and key entry does not flow on the LAN. Since it is not known in which workstation in the LAN the destination user is operating, the search frame is sent to all servers, that is, all workstations.

RESPONSE OPERATION OF THE WORKSTATION WITH A SERVER FUNCTION TO A DESTINATION QUERY

Figure 13:
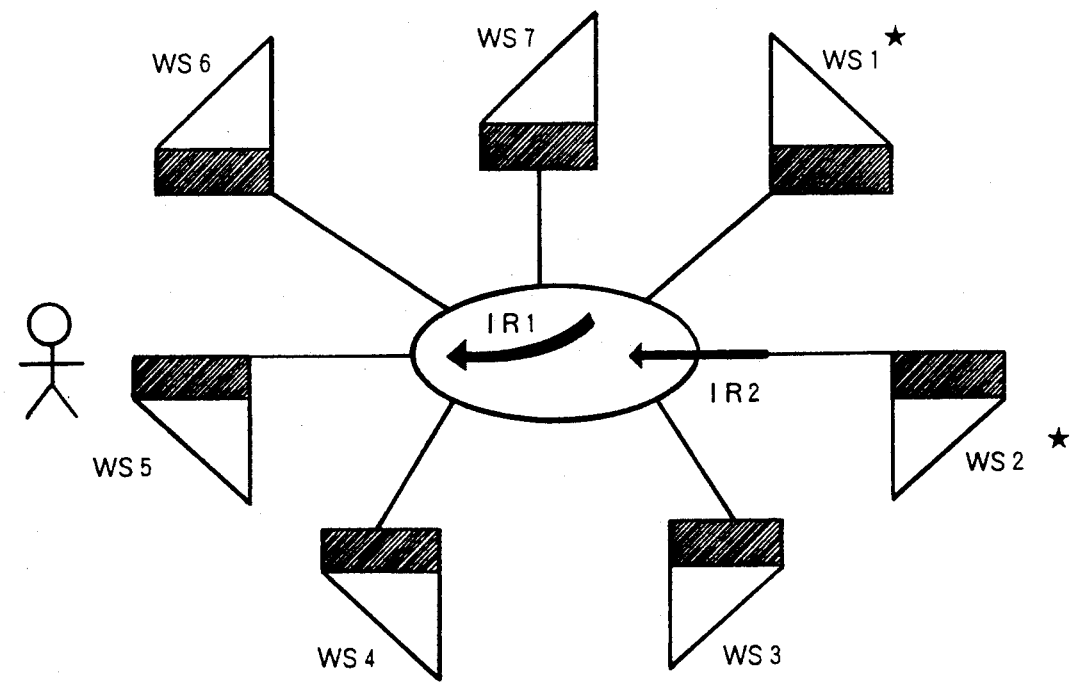
FIG. 13 shows a manner in which an address and an operation time are sent back.

FIG. 13 shows a manner in which the address and the operation times are sent back from a workstation at which the destination user logs on and keys in to a workstation which is the mail delivery requester and the sender of the search frame.

ADDRESS DETERMINATION OF THE WORKSTATION FOR MAIL DELIVERY

FIG. 14 shows a determination table and an internal clock of the workstation when the data frames including the addresses and the operation times are received from a plurality of servers. In this case, since the send times are 00:01 and 00:12, they are compared with the time 00:14 of the internal clock to determine the order of the addresses in an order of addresses having nearer time to the internal clock. Thus, the orders 1 and 2 of the addresses are determined as shown in FIG. 14. If the time of the order 1 is within the allowable time which the user has previously set, that address is adopted and the mail is sent out. If the time of the order 1 is not within the allowable time, the server delivers a destination absence message to the mail delivering requester.

ELEMENTS OF THE DATA FRAME

FIGS. 15A to 15G show elements of the data frame.

FIG. 15A shows a data frame which is sent to the server when the user logs on. The server recognizes the log-on by the log-on message, and reads in the UID, the address and the time for registration.

FIG. 15B shows a data frame which is informed to the server when the user logs off. The server recognizes the log-off by the log-off message, and reads in the UID and the address. Since it is not necessary to register the log-off time in the frame, only the UID and the address are recorded.

FIG. 15C shows a data frame to inform a status to the server in the key entry operation. The frame comprises the UID, the address and the operation time. The time of the UID in the table of the server may be updated by the time in this data frame. This data frame may be sent to the server for every pregiven time period during the key entry operation.

FIG. 15D shows a data frame which is sent back from the server to the queried workstation. The frame has the destination UID, the address and the operation time in a data field, and the address and the UID of the queried workstation in a header field. A data frame sent from the query workstation for querying the destination address includes the server address in a header field and a destination UID, UID and address of the query workstation and a time (FIG. 15D).

FIG. 15F shows a data frame when the workstation receives the data frame sent back from the server and delivers the mail. The destination address received from the server is added to the UID to form the header field, which together with the mail data in the data field are sent to the destination workstation. Now, the data field may include address and UID of the mail delivery workstation.

When the workstation queries the destination address of the mail data to the server, it may send a data frame shown in FIG. 15G, instead of the data frames of FIGS. 15D and 15F, which includes the server address and the destination UID in the header field and the mail data, the UID and address of the query workstation and a time in the data field. The server searches in response to this data frame of FIG. 15G the destination address and sends the data frame of FIG. 15F to the destination workstation and also sends the data frame of FIG. 15E to the queried workstation.

By receiving the data frame of FIG. 15E, the query workstation can thereafter send the mail data to the destination workstation without querying to the server.

OPERATION MONITORING SEQUENCE AT A CLIENT WORKSTATION

Figure 16:
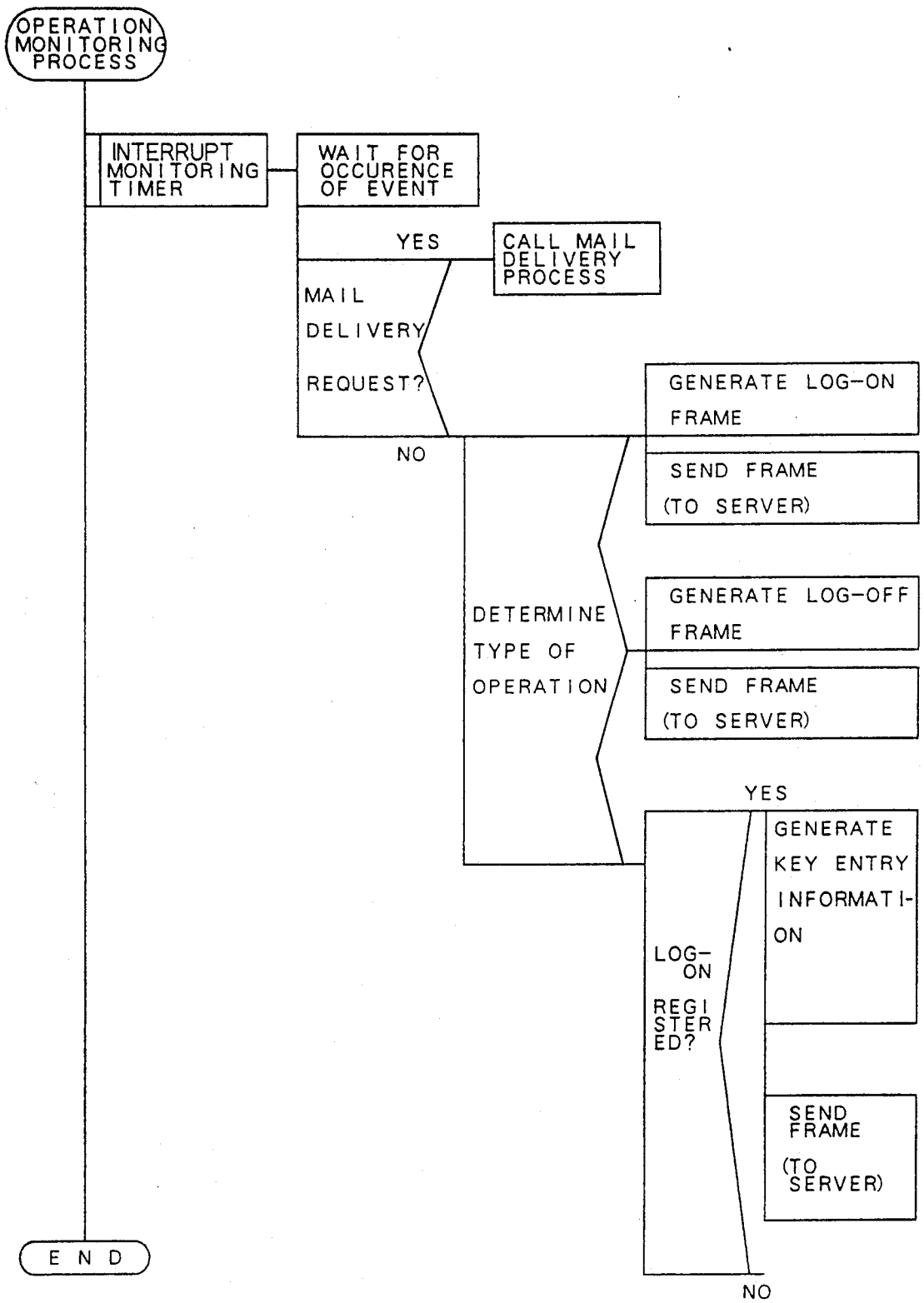
FIGS. 16 to 26 show PAD charts for illustrating the operation of the embodiments of the present invention.

FIG. 16 shows a program which runs at each workstation on the background for generating a data frame representing the user operation obtained by monitoring the user operation at each workstation and for sending it to the server.

It is written in a PAD (problem analysis diagram) form.

The program is waiting for the occurrence of a key entry event. When the key entry event by the user occurs, whether it is a mail delivery request or information relating to operation status is determined. If it is the mail delivery request, a mail delivery routine is called. If it is other key entry event, the type of user operation is determined. The types of operation include three types, log-on information, log-off information and key entry status change information. If it is the log-on information, the log-on frame is generated and it is sent. If it is the log-off information, the log-off frame is generated and sent. If it is other key entry, whether the log-on has been registered or not is checked, and only if the log-on has been registered, the key entry is accepted, and the key entry information frame is generated and sent.

OPERATION MONITORING SEQUENCE IN THE SERVER MACHINE

Figure 17:
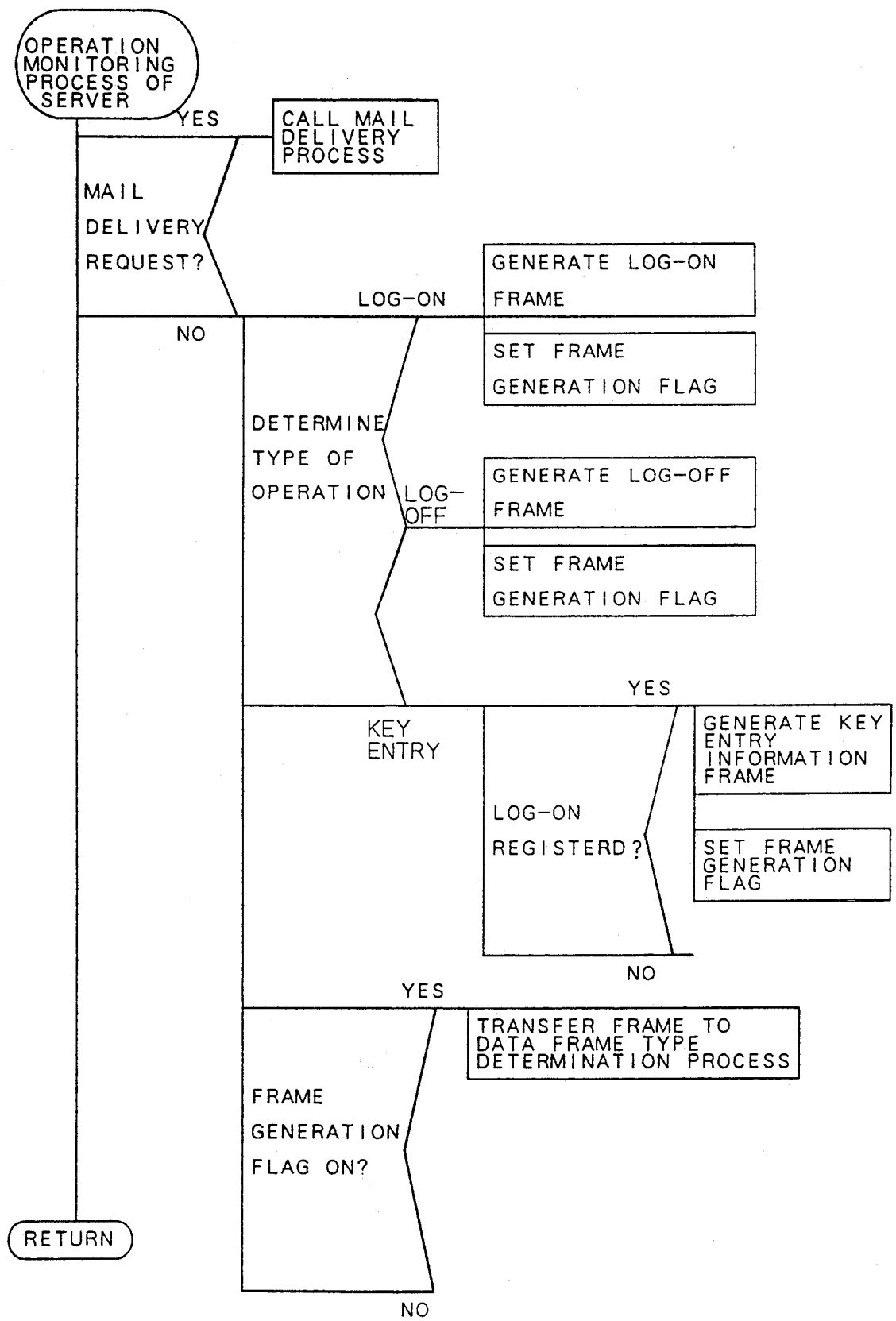

FIG. 17 shows a sub-routine program which runs at a server workstation for monitoring the operation of the user at each workstation, and generating the data frame, to be sent to the workstation from the server, whose content is determined in accordance with the user operation at the workstation. It is written in the PAD form. When an event by the user occurs, whether it is the mail delivery request or the information relating to the operation status is determined. If it is the mail delivery request, a mail delivery process is called. If it is other event, the type of user operation is determined. The types of operation include three types, log-on information, log-off information and key entry status change information. If it is the log-on information, the log-on frame is generated and the frame generation flag is set to "1". If it is the log-off information, the log-off frame is generated and the frame generation flag is set to "1". If it is the key entry status information, whether the log-on has been registered or not is checked, and only if the log-on has been registered, it is accepted and the key entry information frame is generated and the frame generation flag is set to "1". After the frame has been generated, whether the generation frame is "1" or not is checked, and the data frame corresponding to the "1" generation flag is sent to the server. The sub-routine call is terminated by the return.

MONITORING SEQUENCE OF THE CLIENT MACHINE AT THE SERVER

Figure 18:
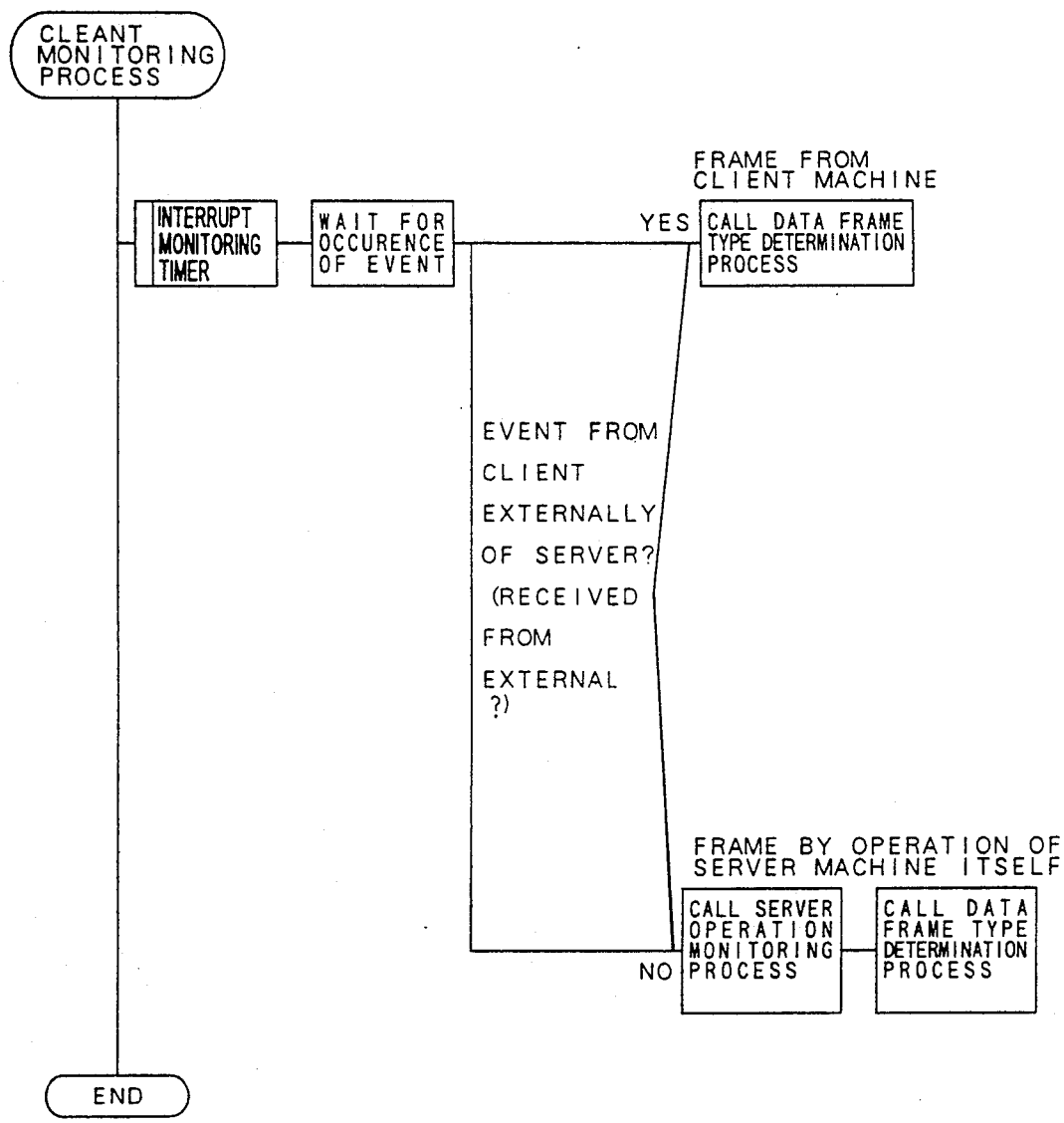

FIG. 18 shows a process program which runs on a background for monitoring the data frame from the client workstation in the server. The program is waiting for the occurrence of event, by an interrupt monitoring timer in the server. When an event occurs in the server, whether it is the communication data frame received from an external client workstation or the data frame from its own machine, that is, the workstation is determined. If it is received from the client machine, the data frame type determination process is called, and the data frame is processed in accordance with the type determined. If it is the frame by the operation in its own server machine, the server operation monitoring sub-routine is called and the data frame type determination process is called as is done when it is externally received, and the data frame is processed in accordance with the type determined.

DATA FRAME TYPE DETERMINATION SEQUENCE

Figure 19:
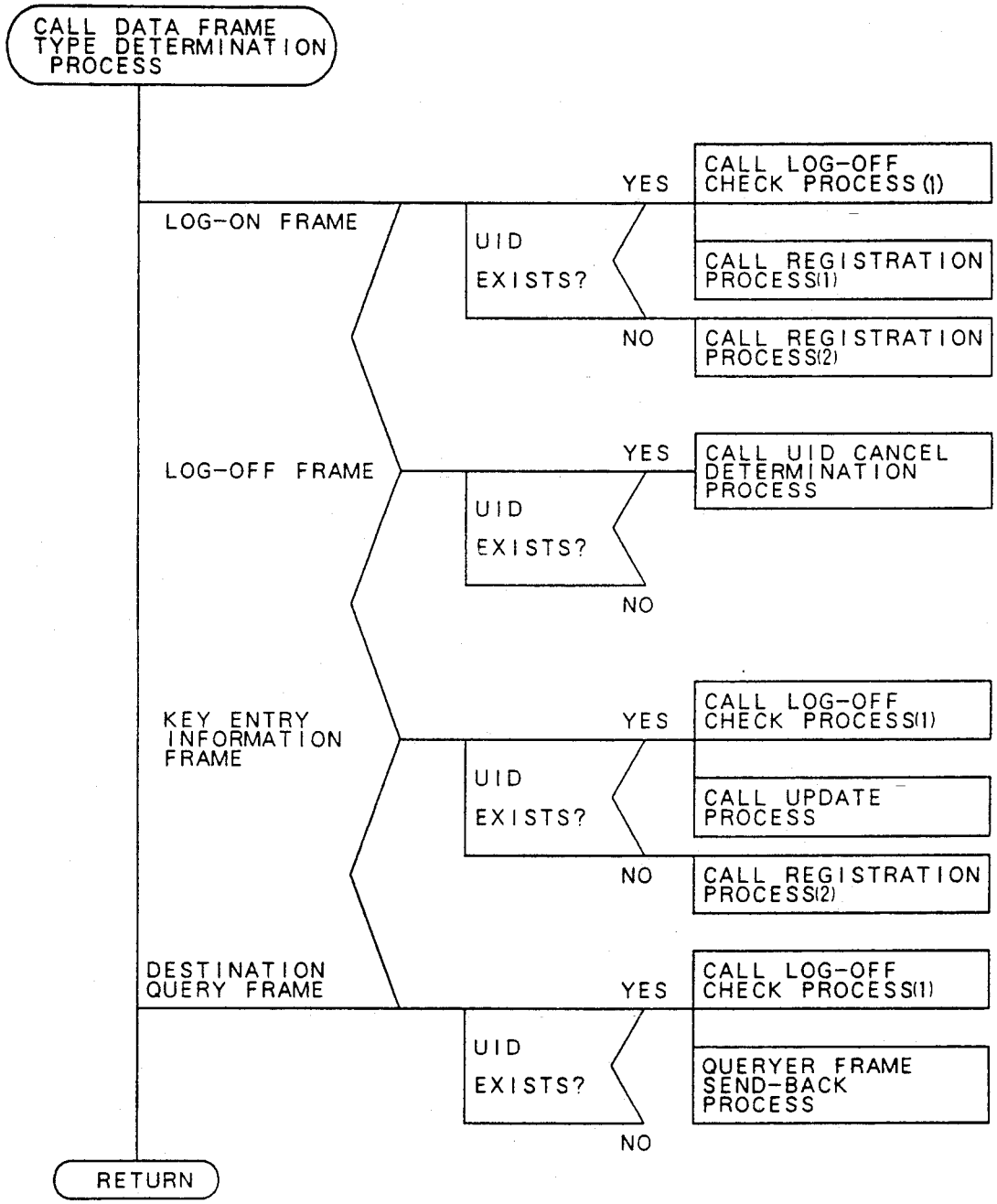

FIG. 19 shows a sub-routine process for determining the type of data frame received from the client. When it is the log-on frame, whether the UID has been registered or not is checked, and if it has been registered, the log-off check process (1) is called to determine if the UID is in the log-off process or not. Then, the registration process (1) is called. If the UID has not been registered, the registration process (2) is called. If it is the log-off frame, whether the UID has been registered or not is checked, and if it has been registered, the UID erase determination process is called. If the UID has not been registered, the data frame is not processed but ignored and the process returns. If it is the key entry frame, and if the UID has been registered, the log-off check process (1) is called to determine whether the UID is in the log-off process or not. Then, the update process (1) is called. If the UID has not been registered, the registration process (2) is called to re-register it. If it is the destination query frame, and if the UID has been registered, the log-off check process (1) is called to determine if the UID is in the log-off process or not. Then, the queryer frame send-back process is called to the queryer. If the UID has not been registered, the data frame is not processed but ignored and the process returns.

SUB-PROCESS SEQUENCE

Figure 20:
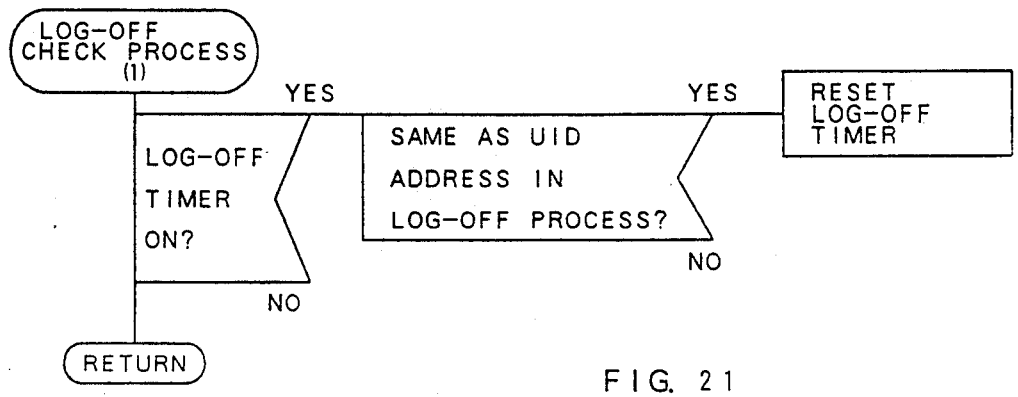

FIGS. 20 to 25 show sub-process which are called by the data frame type determination process. FIG. 20 shows the log-off check process (1) which first determines whether the log-off timer corresponding to the UID and its address of the received data frame is ON or not. The log-off timer is provided in the table for each UID and its each address. If the log-off timer is ON, whether the data frame received from the client machine (workstation) is same as the UID address which is in the log-off process or not is determined. If it is same as the UID address which is in the log-off process, the log-off timer is reset to stop the log-off. If the timer is OFF and the data frame is not equal to the UID and its address which are in the log-off process, no process is carried out and the process returns. Namely, after receiving a log-off data frame of one UID, if a log-on data frame of the same UID having the same address is not received within a pregiven period determined by the log-off timer, the UID and its address in the table are erased, so that it is prevented from registering again the UID and its address when the log-on data frame of the same UID with the same address is received within the pregiven period.

Figure 21:
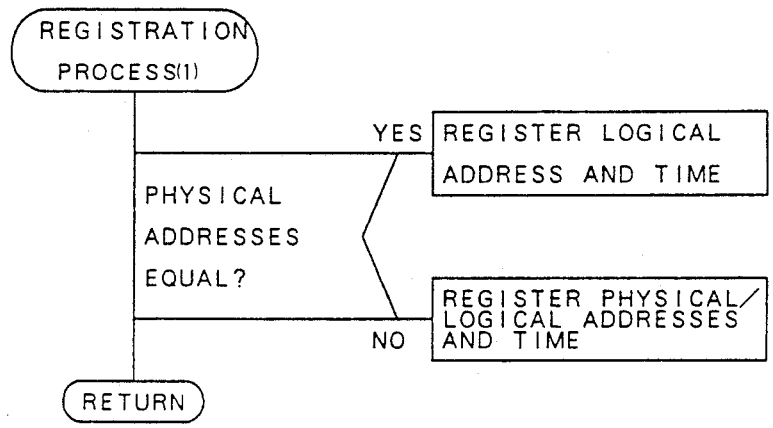

FIG. 21 shows the registration process (1). If the physical address are equal, the logical address and the time are registered, and if the physical addresses are not equal, the physical address, the logical address and the time are registered.

Figures 22, 23:
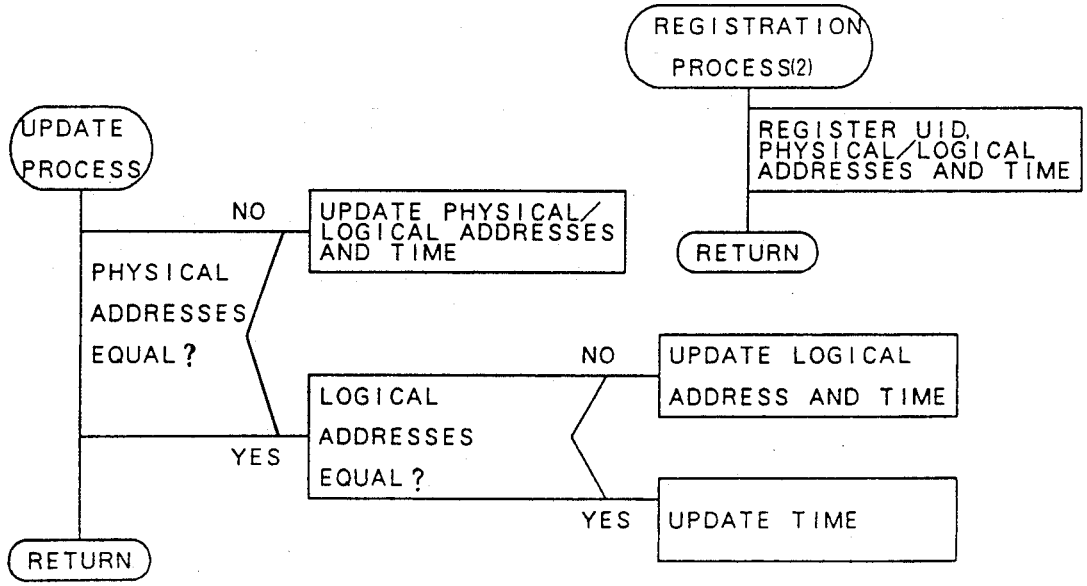

FIG. 22 shows the registration process (2). The UID, the physical address, the logical address and the time are unconditionally registered.

FIG. 23 shows the update process. Whether the physical addresses are equal or not is determined. If they are not equal, the physical address, the logical address and the time are updated. If the physical addresses are equal, whether the logical addresses are equal or not is checked. if they are not equal, the logical address and the time are updated. If the logical address are equal, only the time is updated.

Figure 24:
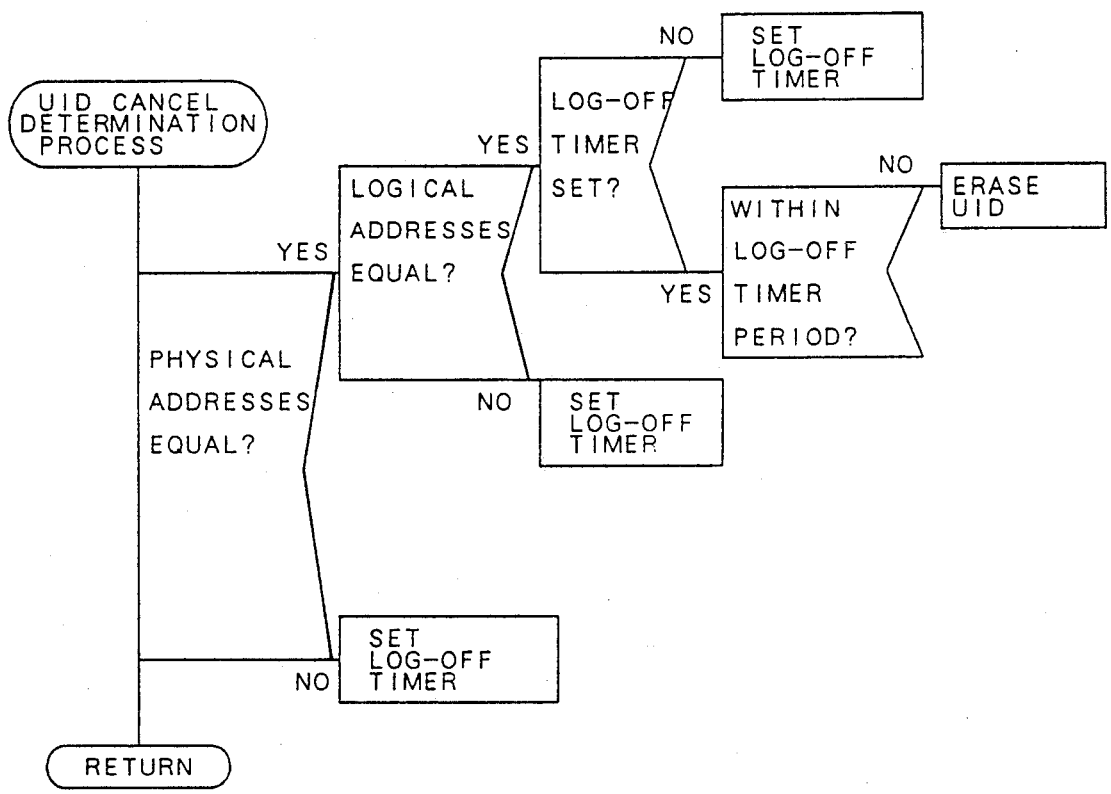

FIG. 24 shows the UID erase determination process which determines whether the UID may be erased or not by the log-off. If the physical addresses are not equal, the log-off timer is set to ON, and if the physical addresses are equal, whether the logical addresses are equal or not is checked. If the logical addresses are not equal, the log-off timer is set to ON, and if the logical addresses are equal, whether the log-off timer has been set to ON or not is checked. If the log-off timer has not been set to ON, the log-off timer is set to ON. If the log-off timer has been set to ON, whether the log-off timer has been timed out or not is checked. If the log-off timer has been timed out, the UID is erased. If the log-off timer has not been timed out, no process is carried out and the process returns.

Figure 25:
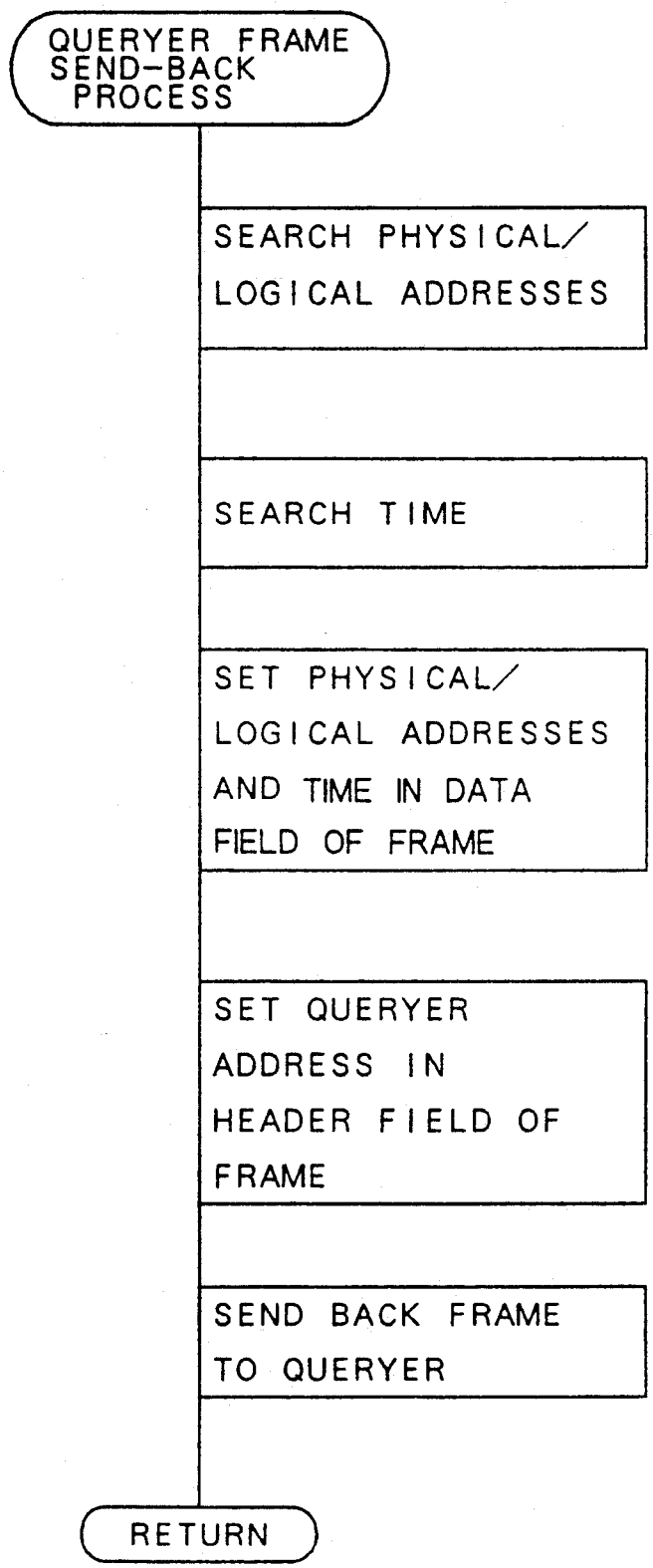

FIG. 25 shows a querying frame send-back process for sending back the address and the time, as the frame data, to the client workstation when servers searches and finds out the destination. When this process is called, the physical address and the logical address corresponding to the UID are searched, and the registered time is also searched. When the above information has been found, the physical address, the logical address and the time are set in the data field of the frame, and the address of the queryer is set in the header field. Thereafter, the frame is sent back to the queryer and the process returns.

MAIL DELIVERY SERVICE PROCESS SEQUENCE IN THE CLIENT WORKSTATION

Figure 26:
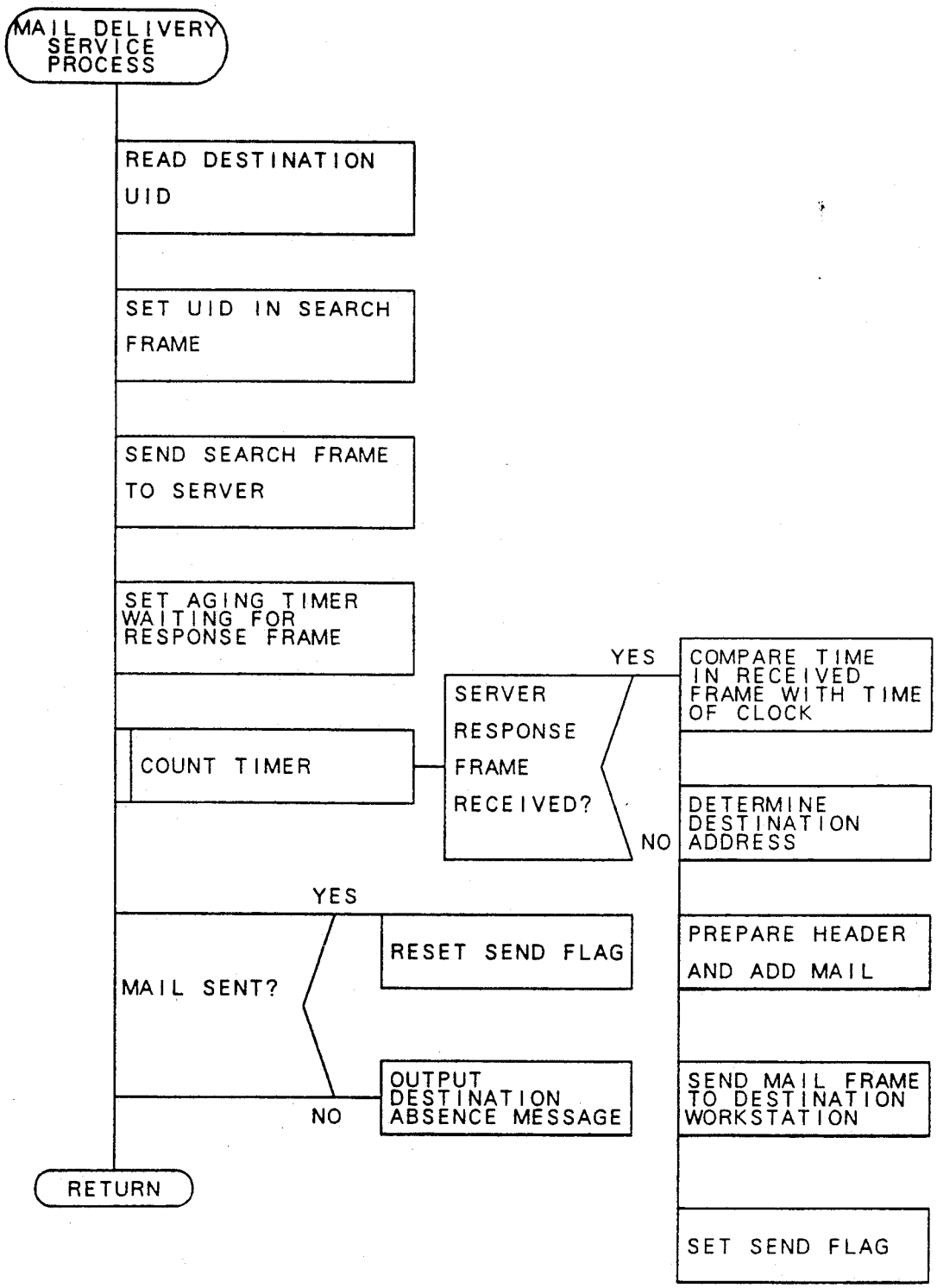

FIG. 26 shows the mail delivery service process which is called when the mail delivery request is issued by the client workstation. After the destination UID has been read, the UID is set in the search frame to the server and the search frame is sent to the server. The search frame is sent to the server by pre-storing the address of the server in the client workstation, or by the broadcasting function. After the search frame has been sent to the server, the server sets an aging timer which waits for the response frame from the server, in case the destination is not found. Further, whether the server response frame has been received from the server or not during the counting operation of the aging timer is monitored. If the frame is received from the server, the time recorded in the received frame is compared with the time of the clock in the workstation to determine the frame having the latest time and whether it is within the allowable time which the user previously set. In this manner, the address of the most appropriate destination is determined. The header is prepared based on the determined address and the body of the mail is added to the data field, and the mail frame is sent to the destination workstation, and the send flag is set. When the aging timer is timed out, whether the mail has been sent or not is checked based on the send flag. If it has been sent, the send flag is reset, and if it has not been sent, a destination absence message is produced and the process returns.

Each workstation may include an unit for reading a UID recorded on a recording medium such as an IC card, a magnetic disk or a magnetic tape when the medium is set (loaded) in the unit and for sending the read UID and its address to the server as a log-on data frame to thereby register them in the server. The unit may send a log-off data frame when the medium is reset (unloaded) therefrom.

In the present invention, the address corresponding to the UID on the table of the server is updated by new address when the user keys in or operates the same workstation after the log-on, and the address may be inhibited, from being sent even if the address search frame is received if the address is not over written over a predetermined period.

The present invention is applicable to LAN of Ethernet type as well as a token ring type and further applicable to a data mailing system of a computer network of distributed processing type. Also, the present invention is applicable to a network system having plural LAN's connected one another.

What is claimed is:

1. A designation delivery system for delivering electronic mail in a network having a plurality of workstations interconnected by at least one local area network (LAN), comprising:

an address management server for mail delivery, said address management server comprises:

means including a table for registering in said table an user identification (UID) of a user who sends and receives a electronic mail, a physical address of a workstation and a logical address corresponding to a program in the workstation as an address of said work station and a time of registering or erasing the UID of the user and the address of the workstation, said time representing a time at which said user logs on to operate said workstation, means for erasing a UID and time when all addresses in said table corresponding to said UID are erased, and means for recording a most recent time at which said user logs on to operate said workstation and information indicating a sequence of key entries or use of a peripheral device by said user after said user has logged on at said workstation;

each of said workstations sending an address search request frame for requesting information of a deliveree UID to the server in the LAN when the user issues a mail delivery request;

said server sending back, in response to said address search request frame sent from said workstation, the address and the time corresponding to the UID to said workstation;

whereby the mail delivery requesting user can deliver the mail without fail by merely designating the destination UID.

2. A designation mail delivery system according to claim 1 wherein said workstation includes means for reading a UID recorded in a recording medium when said recording medium is installed in said reading means, for sending, the read UID and the address of said workstation to said server so that said server registers the UID and the address of said workstation in said table, and for sending a signal for erasing the UID and the address of said workstation registered in said table to said server when said recording medium is removed from said reading means.

3. A designation mail delivery system according to claim 1 wherein said workstation includes means for reading a UID recorded in a recording medium when said medium is installed in said reading means thereby starting operation of said workstation, sending the read UID and the address of said workstation to said server so that said server registers the UID and the address of the workstation in said table and for sending a signal requesting erassure of the UID and the address registered in said table to said server when an operation indicating termination of the operation is performed at said workstation.

4. A designation mail delivery system according to claim 1 wherein said server includes first means for overwriting the address and the time corresponding to the UID on the table of the server to update the address and the time when the user keys in or operates a peripheral device after the user has logged on said workstation.

5. A designation mail delivery system according to claim 1 wherein a plurality of servers are provided in one LAN, and each of said workstations includes means for transmitting the registration, erasure and updating of the UID and the address to the servers by using broadcasting means for a data frame including the UID and the address and causing the servers to learn.

6. A designation mail delivery system according to claim 1 wherein a plurality of servers are provided in one LAN and each of said workstations releases the the address search request frame by broadcasting means when the mail delivery request is issued, and each of said servers, when it receives the address search request, provides the corresponding address and the time when the corresponding UID exists.

7. A designation mail delivery system according to claim 1 wherein a plurality of servers are provided in one LAN, one server is provided to each user group, the server manages the users of its group, and the user sends a data frame including the UID and the address to the server when the UID and the address are registered, erased or updated.

8. A designation mail delivery system according to claim 7 wherein an address query frame is sent to the grouped server from a mail delivery requester, and if there is no query address in the server, the server sends the address search request frame to other servers by broadcasting means.

9. A designation mail delivery system according to claim 1 wherein all workstations connected in one LAN have server functions, and each of said workstations registers, erases and updates the UID and the address on only the table of its own server, and when the workstation receives the address search request frame from another server by broadcasting means, the workstation provides the corresponding address and time if the corresponding UID exists in the table and does not provide the address and time if the corresponding UID does not exist in the table.

10. A designation mail delivery system according to claim 1 wherein said server includes means for recording information indicating operation time or operation sequence when the user keys in or operates a peripheral device after the user has logged on, and inhibiting the providing of the address and the time in response to receipt by the server of the address search request frame when the information indicating operation time or sequence does not change over a predetermined period of time.

11. A designation mail delivery system according to claim 4 wherein said first means includes means for overwriting the address corresponding to the UID on the table of the server to update the address when the user keys in or operates the peripheral device after the log-on, and inhibiting the providing of the address in response to the address search request frame when the address is not overwritten over a predetermined period of time.

12. A designation mail delivery system according to claim 1 wherein the server includes means for searching a destination address in response to a mail delivery request from the user, reporting the destination address to the requester and starting the mail delivery service when the mail with the address is sent from the workstation to the server.

13. A designation mail delivery system according to claim 1 wherein each of said workstations includes means for monitoring key entry operation of the user by a timer and determining the presence or absence of the deliveree user by comparing the recording times when a plurality of address frames are received from the server.

14. A system for delivering a mail to a workstation at which a destination user is present, comprising:
a server for reporting an address of the workstation and a time or only the address to a mail delivery requester based on user workstation operation information generated in response to operation of said workstation by said user; and
another workstation for determining the address of said workstation based on a report from the server and adding the address to the mail to be delivered.

15. A data transfer system for transferring data among plural terminals which are connected through a transmission line each of said terminals performing distributed processing, comprising: each of said terminals comprises:
means for delivering on said line a first signal having an identification information of a user who utilizes the terminal and an identification information of the terminal, and
means for delivering on said line a second signal having an identification information of a destination user to which data is to be transferred and an identification information of the terminal which is a delivery source of the data; and
at least one of said plural terminals comprises:
memory means for receiving the first signal on said line and for storing the identification information of the user and the identification information of the terminal of the first signal in a manner that history of the received identification information of the terminal is stored for each of the identification informations of the users, and
means for receiving the second signal on said line, for searching said memory means on the basis of the identification information of the destination user of the second signal to read out a newest one of the stored identification information of the terminal associated with the received identification information of the user of the second signal and for delivering on said line a third signal having the read identification information and the identification information of the second signal.

16. A data transfer system according to claim 15, wherein each of said terminals further comprises: means for, in response to the third signal, deliverying on said line a fourth signal having the read identification information of the terminal of the received third signal associated with the identification information of the destination user in the second signal, the identification information of the destination user in the second signal, and data to be transmitted to the destination user.

17. A data transfer system according to claim 15, wherein said second signal further has data to be transmitted to the destination user, and said at least one terminal further comprises means for in response to the second signal delivering on said line a fifth signal having the read identification information of the terminal, the identification information of the user and the data to be transmitted to the destination user.

18. A data transfer system according to claim 15, wherein the first signal further has time indicating when the terminal is utilized by a user, and said memory means stores the time together with the identification information of the terminal of the first signal.

19. A data transfer system according to claim 18, wherein said search means reads out one of the identification informations of the terminal associated with the received identification information of the user which is stored with the latest time.

20. A data transfer system according to claim 19, wherein said search means includes a clock representing present time, and means for composing the present time of the clock with times associated with stored identification informations of the terminal associated with the identification information of the user of the received second signal and for reading out one of the identification informations of the terminal which has time nearest to the present time of the clock.

21. A data transfer system according to claim 15, wherein said memory means includes means for updating the stores identification information of the terminal associated with the identification information of the user by the identification information of the terminal associated with the same identification information of the user of the received first signal.

22. A data transfer system for transferring data among plural groups connected through a transmission line, each of said groups has plural terminals which are connected through a transmission line, each terminal performing distributed processing, comprising: each of said plural terminals of each group comprises:
means for delivering on said line a first signal having an identification information of a user who the terminal and an identification information of the terminal, and
means for delivering on said line a second signal having an identification information of a destination user to which data is to be transferred and an identification information of the terminal which is a delivery source of the data; and
at least one of said plural terminals of each group comprises:
memory means for receiving the first signal on said line which is delivered from the terminal of the same group and for storing the identification information of the user and the identification information of the terminal of the first signal in a manner that history of the received identification information of the terminal in stored for each of the identification informations of the users, and
search means for receiving the second signal on said line which is delivered from the terminal of the same group, for searching said memory means on the basis of the identification information of the destination user of the second signal to read out lastly stored one of the identfication informations of the terminal associated with the received identification information of the user of the second signal and for delivering on said line a third signal having the read identification information and the identification information of the second signal.

23. A data transfer system according to claim 22, where in each of said plural terminals further comprises means for, in response to the third signal, deliverying on said line a fourth signal having the read identification information of the terminal of the received third signal associated with the identification information of the destination user in the second signal, the identification information of the destination user in the second signal, and data to be transmitted to the destination user.

24. A data transfer system according to claim 22, wherein said second signal further has data to be transmitted to the destination user, and said at least one terminal further comprises means for, in response to the second signal, delivering on said line a filed signal having the read identification information of the terminal, the identification information of the user and the data to be transmitted to the destination user.

25. A data transfer system according to claim 23, wherein said search means includes means for delivering a sixth signal to the at least one terminal of one of the other groups when there is no stored identification information of the terminal in said memory means associated with the received identification information of the user in the record signal, said sixth signal having the same content as the received record signal, and means for searching said memory means on the basis of the identification information of the destination user of the sixth signal to read out lastly stored one of the identification information of the terminal associated with the received identification information of the user of the sixth signal.

* * * * *